(12) United States Patent
Sano et al.

(10) Patent No.: US 8,688,358 B2
(45) Date of Patent: Apr. 1, 2014

(54) TORQUE ESTIMATING SYSTEM FOR INTERNAL COMBUSTION ENGINE

(75) Inventors: Takeshi Sano, Gotenba (JP); Yusuke Suzuki, Hadano (JP); Shinji Ikeda, Mishima (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 269 days.

(21) Appl. No.: 13/254,699

(22) PCT Filed: Feb. 26, 2010

(86) PCT No.: PCT/JP2010/053091
§ 371 (c)(1),
(2), (4) Date: Sep. 2, 2011

(87) PCT Pub. No.: WO2010/101087
PCT Pub. Date: Sep. 10, 2010

(65) Prior Publication Data
US 2012/0004821 A1    Jan. 5, 2012

(30) Foreign Application Priority Data
Mar. 6, 2009    (JP) ................................ 2009-053918

(51) Int. Cl.
*F02D 41/24* (2006.01)
(52) U.S. Cl.
USPC .......................................... 701/111; 123/435
(58) Field of Classification Search
USPC ........... 123/435, 436; 701/103–105, 110–111
See application file for complete search history.

(56) References Cited

U.S. PATENT DOCUMENTS

| 6,866,024 | B2* | 3/2005 | Rizzoni et al. | 123/430 |
| 7,748,261 | B2* | 7/2010 | Sakayanagi | 73/114.15 |
| 7,809,489 | B2* | 10/2010 | Koeller et al. | 701/103 |
| 7,958,779 | B2* | 6/2011 | Nagano et al. | 73/114.25 |
| 8,055,432 | B2* | 11/2011 | Sun et al. | 701/103 |

FOREIGN PATENT DOCUMENTS

| JP | 64-038624 A | 2/1989 | |
| JP | 2005-105822 A | 4/2005 | |
| JP | 2005-330847 | * 12/2005 | ............. F02D 45/00 |
| JP | 2005-337225 A | 12/2005 | |
| JP | 2006-138293 A | 6/2006 | |
| JP | 2007-032296 A | 2/2007 | |

* cited by examiner

*Primary Examiner* — Hai Huynh
(74) *Attorney, Agent, or Firm* — Sughrue Mion, PLLC

(57) ABSTRACT

A torque estimating system for an internal combustion engine includes a plurality of cylinders and estimates torque for each cylinder. A cylinder pressure of a cylinder pressure sensor (CPS) mounted cylinder #1 is acquired. Measured indicated torque $Te_1$ resulting from an explosion in the CPS-mounted cylinder #1 is calculated based on the cylinder pressure. A first angular acceleration $d\omega_1/dt$ and a second angular acceleration $d\omega_2/dt$ are calculated. Estimated indicated torque $Te_2$ resulting from an explosion in a CPS-less cylinder #2 is calculated using the measured indicated torque $Te_1$ of the CPS-mounted cylinder #1 and a difference value between the second angular acceleration $d\omega_2/dt$ and the first angular acceleration $d\omega_1/dt$.

4 Claims, 5 Drawing Sheets

TORQUE ESTIMATING SYSTEM FOR INTERNAL COMBUSTION ENGINE

CROSS REFERENCE TO RELATED APPLICATIONS

This application is a National Stage of International Application No. PCT/JP2010/053091 filed Feb. 26, 2010, claiming priority based on Japanese Patent Application No. 2009-053918 filed Mar. 6, 2009, the contents of all of which are incorporated herein by reference in their entirety.

TECHNICAL FIELD

The present invention relates to a system for estimating torque for an internal combustion engine.

BACKGROUND ART

A combustion variation detecting apparatus for an internal combustion engine for detecting variations in combustion using variations in torque and rotation of the internal combustion engine has been proposed, as disclosed in, for example, JP-A-64-38624. More specifically, the apparatus calculates indicated torque based on an output signal from a cylinder pressure sensor disposed in part of cylinders. A difference between a torque mean value calculated from a history of past indicated torque and the indicated torque calculated is then calculated to find a torque variation. The torque variation is then used to detect a combustion variation.

PRIOR ART LITERATURE

Patent Documents

Patent Document 1: JP-A-64-38624
Patent Document 2: JP-A-2007-32296

SUMMARY OF THE INVENTION

Problem to be Solved by the Invention

While being able to calculate torque through combustion of the cylinder in which the cylinder pressure sensor is mounted, the conventional apparatus is, however, unable to calculate torque for other cylinders. Specifically, the conventional apparatus is unable to calculate an absolute value of torque for each cylinder of the internal combustion engine and there is a need for improvement.

The present invention has been made to solve the foregoing problem and it is an object of the present invention to provide a torque estimating system for an internal combustion engine including a plurality of cylinders, the system being capable of accurately estimating torque for each cylinder.

Means for Solving the Problem

In accomplishing the above object, according to a first aspect of the present invention, there is provided a torque estimating system for an internal combustion engine including a plurality of cylinders, the system comprising:

a cylinder pressure sensor disposed in a predetermined cylinder (hereinafter referred to as a first cylinder) of the internal combustion engine;

means for acquiring a cylinder pressure of the first cylinder based on a detection signal of the cylinder pressure sensor;

means for calculating a crank angular acceleration (hereinafter referred to as a first angular acceleration) resulting from an explosion in the first cylinder;

means for calculating a crank angular acceleration (hereinafter referred to as a second angular acceleration) resulting from an explosion in a cylinder (hereinafter referred to as a second cylinder) in which the explosion takes place following the first cylinder; and means for calculating estimated indicated torque resulting from the explosion in the second cylinder using a difference value between the second angular acceleration and the first angular acceleration, and the cylinder pressure of the first cylinder.

According to a second aspect of the present invention, there is provided the system as described in the first aspect, further comprising:

means for calculating measured indicated torque resulting from the explosion in the first cylinder based on the cylinder pressure of the first cylinder, wherein: the estimated indicated torque calculating means calculates estimated indicated torque resulting from the explosion in the second cylinder using the difference value and the measured indicated torque of the first cylinder.

According to a third aspect of the present invention, there is provided the system as described in the second aspect, wherein: the estimated indicated torque calculating means calculates a sum of the difference value multiplied by a moment of inertia and the measured indicated torque as the estimated indicated torque resulting from the explosion in the second cylinder.

According to a fourth aspect of the present invention, there is provided the system as described in the second or third aspects, further comprising:

second means for calculating estimated indicated torque of a cylinder for which torque is to be estimated (hereinafter referred to as a cylinder of interest), using estimated indicated torque of a cylinder (hereinafter referred to as a preceding cylinder of interest) in which explosion takes place immediately before the cylinder of interest, and a difference value between an angular acceleration resulting from an explosion of the cylinder of interest and an angular acceleration resulting from an explosion of the preceding cylinder of interest.

According to a fifth aspect of the present invention, there is provided the system as described in any one of the first to fourth aspects, wherein: if the cylinder pressure sensor is to be disposed in a plurality of cylinders, the number of cylinders in which the explosion takes place between cylinders having the cylinder pressure sensors is equal.

Effects of the Invention

In the first aspect of the present invention, changes in the crank angular acceleration and torque variations are correlated with each other. The difference value between the angular acceleration of the second cylinder (second angular acceleration) and the angular acceleration of the first cylinder (first angular acceleration) is, therefore, correlated with torque variations from the torque of the first cylinder. Therefore, the aspect of the present invention allows indicated torque of the second cylinder for which the cylinder pressure is not measured to be accurately estimated based on the cylinder pressure of the first cylinder measured with the cylinder pressure sensor and the difference value between the angular accelerations in question.

In the second aspect of the present invention, measured torque of the first cylinder is calculated based on the cylinder pressure of the first cylinder measured with the cylinder pressure sensor. Therefore, the aspect of the present invention allows the indicated torque of the second cylinder for which the cylinder pressure is not measured to be accurately estimated based on measured indicated torque of the first cylinder and the difference value between the second angular acceleration and the first angular acceleration.

In the third aspect of the present invention, the difference value between the second angular acceleration and the first angular acceleration, multiplied by the moment of inertia represents the torque variations from the indicated torque of the first cylinder. Therefore, the aspect of the present invention allows the indicated torque of the second cylinder to be accurately estimated by adding the difference value to the measured indicated torque of the first cylinder.

In the fourth aspect of the present invention, the indicated torque of the cylinder of interest is estimated based on estimated indicated torque of the preceding cylinder of interest and the difference value between the angular acceleration of the cylinder of interest and the angular acceleration of the preceding cylinder of interest. Therefore, the aspect of the present invention allows the indicated torque to be accurately estimated in sequence even if an explosion in the cylinder having no cylinder pressure sensors takes place consecutively.

In the fifth aspect of the present invention, if the cylinder pressure sensor is to be disposed in a plurality of cylinders, cylinders in which the cylinder pressure sensor is disposed are set such that the number of cylinders in which the explosion takes place between the cylinders having the cylinder pressure sensors is equal. Therefore, the aspect of the present invention minimizes the number of cylinders in which the explosion takes place, the cylinders having no cylinder pressure sensors, so that an error to be superimposed on the estimated indicated torque can be effectively reduced.

MODE FOR CARRYING OUT THE INVENTION

Figure 1:
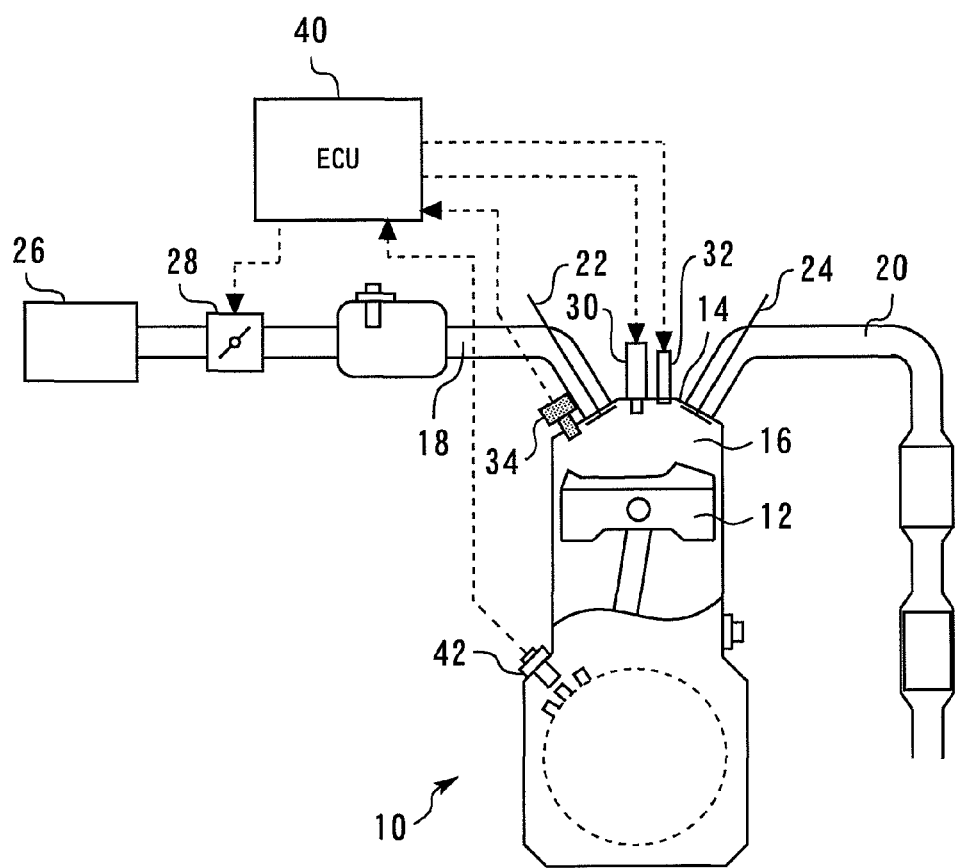
FIG. 1 is a schematic configuration diagram for illustrating a system configuration as an embodiment of the present invention.

An embodiment of the present invention will be described below with reference to the accompanying drawings. Like or corresponding parts are identified in each of the drawings by the same reference numerals and descriptions for those parts will not be duplicated. It is also to be understood that the following embodiment does not limit the invention.

Embodiment

[Arrangements of the Embodiment]

FIG. 1 is a schematic configuration diagram for illustrating a system configuration as an embodiment of the present invention. Referring to FIG. 1, the system according to the embodiment includes an internal combustion engine 10. The internal combustion engine 10 is configured as a spark ignition engine including a plurality of cylinders (for example, six cylinders). Note that FIG. 1 schematically shows a cross section of one cylinder of the internal combustion engine 10. The cylinder of the internal combustion engine 10 includes a piston 12 that reciprocates therein. The internal combustion engine 10 also includes a cylinder head 14. A combustion chamber 16 is formed between the piston 12 and the cylinder head 14. Each of an intake path 18 and an exhaust path 20 has a first end communicating with the combustion chamber 16. An intake valve 22 and an exhaust valve 24 are disposed at a communicating portion between the intake path 18 and the combustion chamber 16 and a communicating portion between the exhaust path 20 and the combustion chamber 16, respectively.

An air cleaner 26 is disposed at an entrance of the intake path 18. A throttle valve 28 is disposed downstream of the air cleaner 26. The throttle valve 28 is an electronically controlled valve driven by a throttle motor based on an accelerator operation amount.

An ignition plug 30 is mounted on the cylinder head 14 so as to protrude from an apex of the combustion chamber 16 thereinto. The cylinder head 14 also includes a fuel injection valve 32 for injecting fuel into the cylinder. In addition, the cylinder head 14 has a built-in cylinder pressure sensor (CPS) 34 for detecting a cylinder pressure. The cylinder pressure sensor 34 is disposed on only part (for example, one cylinder only) of the plurality of cylinders of the internal combustion engine 10.

The system of the embodiment includes an ECU (electronic control unit) 40 as shown in FIG. 1. Various types of sensors are connected to an input section of the ECU 40, including a crank angle sensor 42 for detecting a rotational position of a crankshaft and the above-mentioned cylinder pressure sensor 34. Various types of actuators are connected to an output section of the ECU 40, including the throttle valve 28, the ignition plug 30, and the fuel injection valve 32 mentioned earlier. The ECU 40 controls an operating condition of the internal combustion engine 10 based on various types of information inputted thereto.

[Operation of the Embodiment]

A method for estimating, in sequence, indicated torque of each cylinder of the internal combustion engine 10 will be specifically described with reference to FIG. 2. The internal combustion engine 10 of this embodiment includes the cylinder pressure sensor 34. In a cylinder in which the cylinder pressure sensor 34 is mounted (hereinafter referred to as a "CPS-mounted cylinder"), a behavior of the cylinder pressure resulting from an explosion in the CPS-mounted cylinder can be detected. Consequently, in the CPS-mounted cylinder, the cylinder pressure detected may be used to calculate the indicated torque resulting from the explosion in the cylinder in question. The indicated torque calculated based on an output from the cylinder pressure sensor 34 will hereinafter be referred to as "measured indicated torque"). A number of methods are well-known for calculating the measured indicated torque using the CPS and a description for these methods will be omitted.

If each of the plurality of cylinders of the internal combustion engine 10 is adapted to include the cylinder pressure sensor 34, the measured indicated torque of each cylinder can be calculated. However, providing each of the plurality of cylinders with the cylinder pressure sensor 34 is impractical because of various types of restrictions involved. The inventor of this invention has invented a torque estimating system for an internal combustion engine capable of accurately estimating the indicated torque of all cylinders even with a configuration having the cylinder pressure sensor 34 in only part of the cylinders. An even greater detailed description will be given below with reference to FIG. 2.

Figure 2:
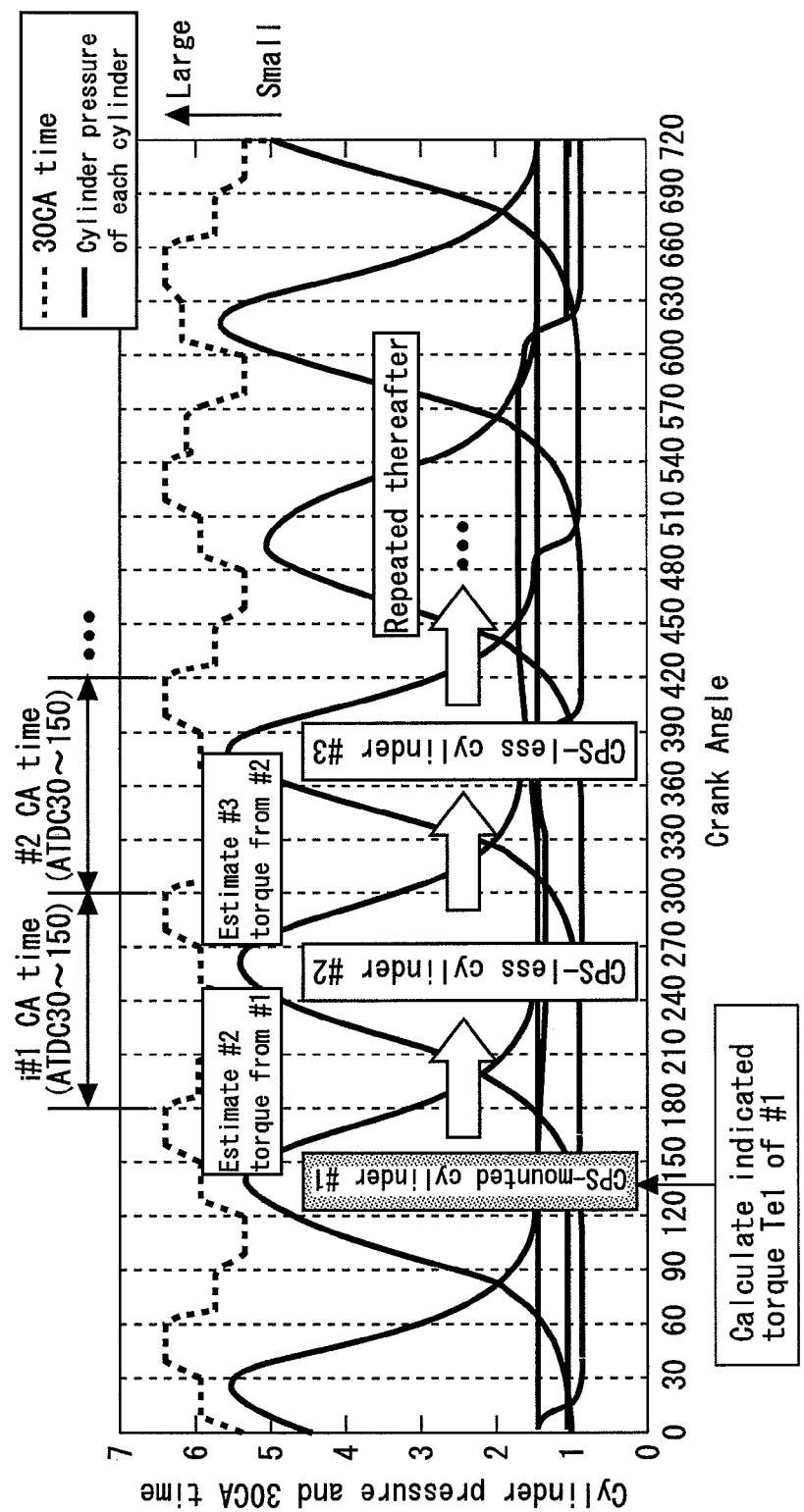
FIG. 2 is a graph showing changes in the cylinder pressure of each cylinder of the internal combustion engine 10 and in 30° CA time of the crankshaft.

FIG. 2 is a graph showing changes in the cylinder pressure of each cylinder of the internal combustion engine 10 and in 30° CA time of the crankshaft. In this graph, #1 denotes the CPS-mounted cylinder and #2 or more denotes a cylinder having no cylinder pressure sensor 34 (hereinafter referred to as a "CPS-less cylinder").

An indicated torque Te can be expressed as an equation (1) given below in accordance with an equation of motion:

$$I \times (d\omega/dt) = Te - Fr \quad (1)$$

In the equation (1) given above, I denotes a moment of inertia of a driving member driven by combustion of a mixture, specifically, a constant determined based on a hardware configuration of the internal combustion engine 10. $d\omega/dt$ represents an angular acceleration of the crankshaft. Consequently, $I \times (d\omega/dt)$ represents net torque of the internal combustion engine 10 calculated from the angular acceleration of the crankshaft.

Additionally, Fr represents friction torque of a driving section. The friction torque Fr refers to torque of mechanical friction between fitting parts, such as friction between the piston and an internal wall of the cylinder, including torque of mechanical friction of auxiliaries.

Where, $I \times (d\omega/dt)$ can be calculated based on a crank angle signal supplied by the crank angle sensor 42. Let $Te_1$ be indicated torque of the CPS-mounted cylinder #1 and $Te_2$ be indicated torque of the CPS-less cylinder #2. Then, $Te_1$ and $Te_2$ can be expressed as the following equations, respectively:

$$I \times (d\omega_1/dt) = Te_1 - Fr \quad (2)$$

$$I \times (d\omega_2/dt) = Te_2 - Fr \quad (3)$$

In the equation (2) above, $d\omega_1/dt$ represents a mean value of the angular acceleration for CA time (e.g., ATDC 30° CA to 150° CA of #1) preset as a period of time during which torque resulting from the explosion in the CPS-mounted cylinder #1 is generated. Similarly, in the equation (3) above, $d\omega_2/dt$ represents a mean value of the angular acceleration for CA time (ATDC 30° CA to 150° CA of #2) of the CPS-less cylinder #2.

In normal operation of the internal combustion engine 10, variations in friction torque among different cylinders are so small as to be negligible. Thus, the following equation holds if the friction torque Fr equals in the equations (2) and (3):

$$Te_2 = Te_1 + I \times (d\omega_2/dt - d\omega_1/dt) \quad (4)$$

As described earlier, the measured indicated torque of $Te_1$ can be calculated using the cylinder pressure sensor 34. Similarly, $I \times (d\omega_2/dt - d\omega_1/dt)$ can be calculated based on the crank signal from the crank angle sensor 42. Substitution of these values into the equation (4) above allows the indicated torque of the CPS-less cylinder #2 in which an explosion takes place following the CPS-mounted cylinder #1 to be accurately estimated.

An equation (5) given below holds, if the equation (4) above is generalized, letting k be a cylinder for which torque is to be calculated and k−1 be a cylinder in which the explosion takes place immediately before cylinder k:

$$Te_k = Te_{k-1} + I \times (d\omega_k/dt - d\omega_{k-1}/dt) \quad (5)$$

For indicated torque $Te_k$ of a CPS-less cylinder #3 and subsequent ones, therefore, use of the equation (5) above allows the indicated torque to be sequentially estimated in order of the explosion.

Figure 3A:
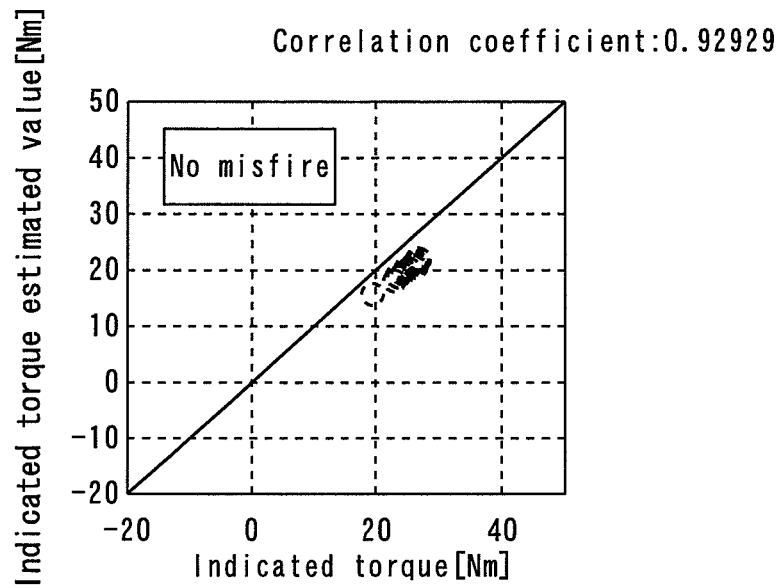
FIGS. 3(A) and 3(B) are illustrations showing comparison results between indicated torque estimated by the system of this embodiment and true values of the indicated torque.
Figure 3B:
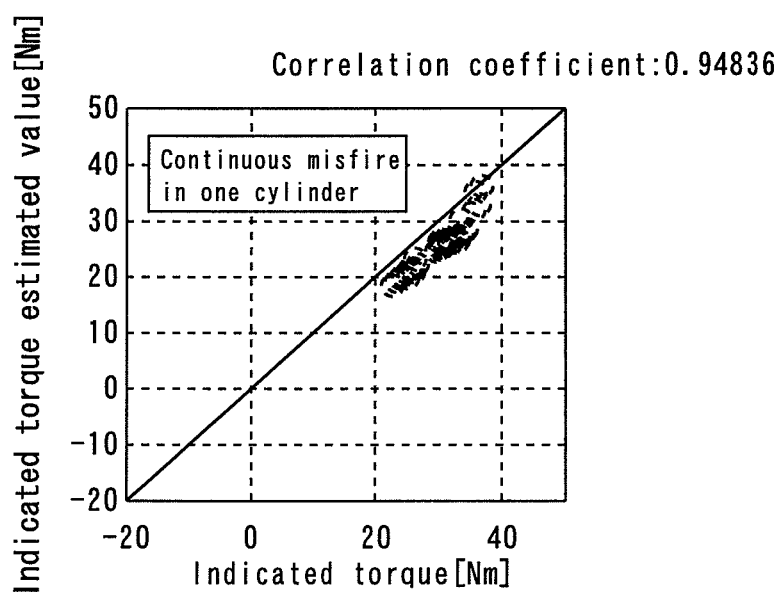

FIGS. 3(A) and 3(B) compare indicated torque estimated by the system of this embodiment with true values of the indicated torque. Specifically, FIG. 3(A) shows a case in which a misfire does not occur in any of the cylinders and FIG. 3(B) shows a case in which a continuous misfire occurs in one of the plurality of cylinders.

The figures reveal that the indicated torque can be accurately estimated even when the continuous misfire occurs in a specific cylinder. This shows that the system of this embodiment calculates the measured indicated torque of a specific cylinder to thereby estimate the indicated torque of the subsequent cylinder as an absolute quantity, instead of simply estimating torque variations among different cylinders. This inhibits a situation in which an error arising from, for example, a misfire in a specific cylinder is endlessly superimposed on the estimated indicated torque of the subsequent cylinders.

[Specific Processing Performed in this Embodiment]

Figure 4:
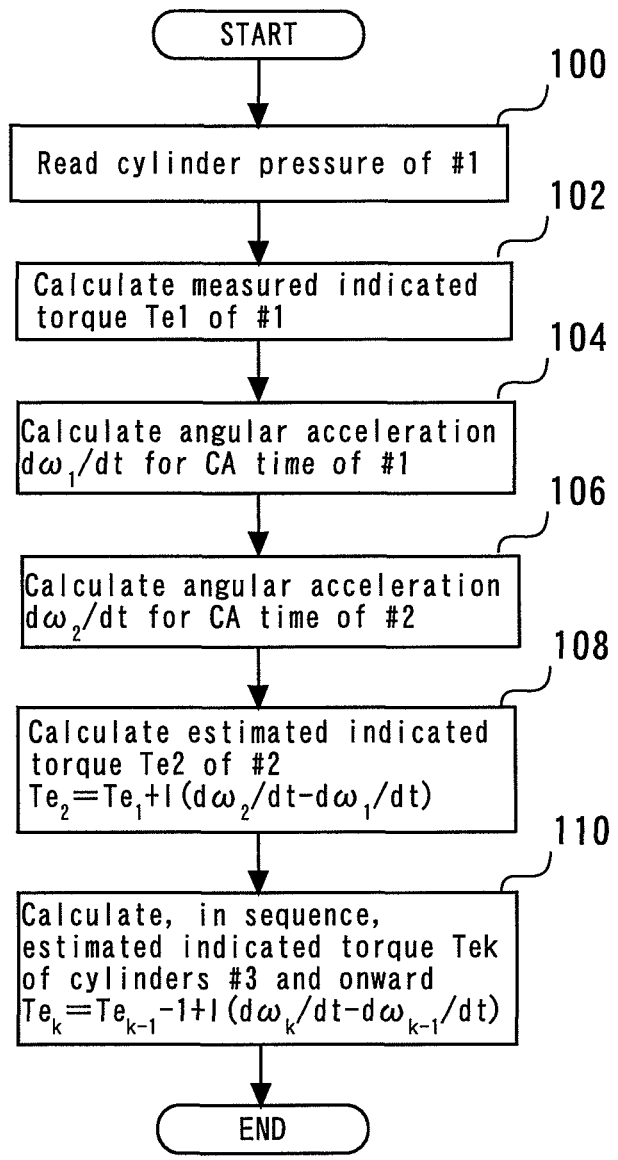
FIG. 4 is a flow chart showing a routine that is executed in accordance with an embodiment of the present invention.

Specific processing performed in this embodiment will be described below with reference to FIG. 4. FIG. 4 is a flow chart showing a routine performed by the ECU 40 to estimate the indicated torque.

Referring to the routine shown in FIG. 4, the cylinder pressure of the CPS-mounted cylinder #1 is read (step 100). Specifically, a detection signal of the cylinder pressure sensor 34 during the explosion in the CPS-mounted cylinder #1 is read.

Next, the measured indicated torque $Te_1$ is calculated (step 102). Specifically, the measured indicated torque resulting from the explosion in the CPS-mounted cylinder #1 is calculated based on a cylinder pressure behavior read in step 100 above.

Then, the angular acceleration $d\omega_1/dt$ for the CA time of the CPS-mounted cylinder #1 is calculated (step 104). Specifically, the angular acceleration $d\omega_1/dt$ for the period of time of ATDC 30° CA to 150° CA of #1 is calculated. Then, the angular acceleration $d\omega_2/dt$ for the CA time of the CPS-less cylinder #2 is calculated (step 106). Specifically, the angular acceleration $d\omega_2/dt$ for the period of time of ATDC 30° CA to 150° CA of #2 is calculated.

In the routine shown in FIG. 4, the estimated indicated torque $Te_2$ of the CPS-less cylinder #2 is next calculated (step 108). Specifically, the measured indicated torque $Te_1$ calculated in step 102 and the angular accelerations $d\omega_1/dt$ and $d\omega_2/dt$ calculated in steps 104 and 106, respectively, are substituted in the equation (4) above.

Then, the estimated indicated torque $Te_k$ of the CPS-less cylinder #3 and subsequent ones are sequentially calculated (step 110). Specifically, the indicated torque $Te_{k-1}$ of the cylinder in which the explosion takes place immediately before the cylinder of interest is substituted in the equation (5) above to thereby calculate, in sequence, the indicated torque $Te_k$ of the cylinder in which the explosion takes place next.

As described heretofore, in the system of the embodiment, by using the measured indicated torque of the CPS-mounted cylinder #1, the indicated torque of the CPS-less cylinder #2 in which the explosion takes place following the CPS-mounted cylinder #1 can be accurately estimated. Further, the indicated torque $Te_k$ of the cylinders in which the explosion takes place following the CPS-less cylinder #2 can be estimated, in sequence, based on the indicated torque $Te_{k-1}$ of the cylinder in which the explosion takes place immediately before the cylinder of interest.

In the embodiment described above, the cylinder pressure sensor 34 is disposed in the cylinder #1 of the internal combustion engine 10 including six cylinders. This is, however, not the only possible system configuration. Specifically, the internal combustion engine 10 may include eight cylinders or four cylinders, as long as the internal combustion engine 10 includes a plurality of cylinders. The cylinder pressure sensor 34 may be mounted in, not only a single cylinder, but also a plurality of cylinders, as long as the cylinder pressure sensor 34 is adapted to be disposed in part of the cylinders. If the cylinder pressure sensor 34 is to be disposed in a plurality of cylinders, preferably the arrangement requires that the number of CPS-less cylinders in which the explosion takes place between the CPS-mounted cylinders be as equal as possible.

Figure 5A:
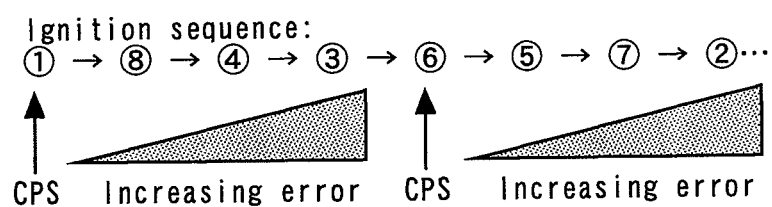
FIGS. 5(A) and 5(B) are illustrations showing examples of arrangements in which the cylinder pressure sensor is mounted in a plurality of cylinders.
Figure 5B:
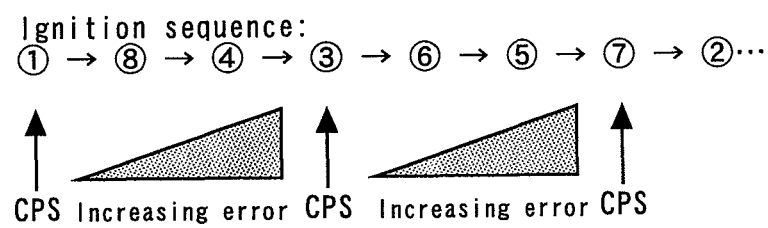

FIGS. 5(A) and 5(B) are illustrations showing examples of arrangements in which the cylinder pressure sensor is mounted in a plurality of cylinders. FIG. 5(A) shows a case in which the cylinder pressure sensors are mounted in two of eight cylinders of an eight-cylinder internal combustion engine. FIG. 5(B) shows a case in which the cylinder pressure sensors are mounted in three of the eight cylinders of the eight-cylinder internal combustion engine.

In FIG. 5(A), each of cylinder #1 and cylinder #6 is mounted with a cylinder pressure sensor. In such an arrangement, the measured indicated torque is calculated for every four cylinders, so that the error can be effectively inhibited from increasing. In FIG. 5(B), each of cylinder #1, cylinder #3, and cylinder #7 is mounted with a cylinder pressure sensor. In such an arrangement, the measured indicated torque is calculated for every two or three cylinders, so that the error can again be effectively inhibited from increasing.

The cylinder pressure sensor 34 in the embodiment described above corresponds to the "cylinder pressure sensor" in the first aspect of the present invention, the CPS-mounted cylinder #1 in the embodiment corresponds to the "first cylinder" in the first aspect of the present invention, the CPS-less cylinder #2 in the embodiment corresponds to the "second cylinder" in the first aspect of the present invention, $d\omega_1/dt$ in the embodiment corresponds to the "first angular acceleration" in the first aspect of the present invention, and $d\omega_2/dt$ in the embodiment corresponds to the "second angular acceleration" in the first aspect of the present invention. Similarly, performance of step 100 by the ECU 40 achieves the "cylinder pressure acquiring means" in the first aspect of the present invention, performance of step 104 achieves the "first angular acceleration calculating means" in the first aspect of the present invention, performance of step 106 achieves the "second angular acceleration calculating means" in the first aspect of the present invention, and performance of step 108 achieves the "estimated indicated torque calculating means" in the first aspect of the present invention.

Similarly, performance of step 102 by the ECU 40 in the embodiment described above achieves the "measured indicated torque calculating means" in the second aspect of the present invention and performance of step 108 achieves the "estimated indicated torque calculating means" in the second aspect of the present invention.

Similarly, performance of step 110 by the ECU 40 in the embodiment described above achieves the "second estimated indicated torque calculating means" in the fourth aspect of the present invention.

DESCRIPTION OF REFERENCE CHARACTERS

10 . . . Internal combustion engine
12 . . . Piston
14 . . . Cylinder head
18 . . . Intake path
20 . . . Exhaust path
22 . . . Intake valve
24 . . . Exhaust valve
26 . . . Air cleaner
28 . . . Throttle valve
30 . . . Ignition plug
32 . . . Fuel injection valve
34 . . . Cylinder pressure sensor (CPS)
40 . . . ECU (electronic control unit)
42 . . . Crank angle sensor

The invention claimed is:

1. A torque estimating system for an internal combustion engine including a plurality of cylinders, the system comprising:
   a cylinder pressure sensor disposed in a predetermined first cylinder of the internal combustion engine;
   means for acquiring a cylinder pressure of the first cylinder based on a detection signal of the cylinder pressure sensor;
   means for calculating a first crank angular acceleration resulting from an explosion in the first cylinder;
   means for calculating a second crank angular acceleration resulting from an explosion in a second cylinder in which the explosion takes place following the first cylinder;
   means for calculating measured indicated torque resulting from the explosion in the first cylinder based on the cylinder pressure of the first cylinder; and
   means for calculating estimated indicated torque resulting from the explosion in the second cylinder using a difference value between the second angular acceleration and the first angular acceleration, and the measured indicated torque of the first cylinder,
   wherein: the estimated indicated torque calculating means calculates a sum of the difference value multiplied by a moment of inertia and the measured indicated torque as the estimated indicated torque resulting from the explosion in the second cylinder.

2. The torque estimating system for the internal combustion engine according to claim 1, further comprising:
   second means for calculating estimated indicated torque of a cylinder of interest for which torque is to be estimated, using estimated indicated torque of a preceding cylinder of interest in which explosion takes place immediately before the cylinder of interest, and a difference value between an angular acceleration resulting from an explosion of the cylinder of interest and an angular acceleration resulting from an explosion of the preceding cylinder of interest.

3. The torque estimating system for the internal combustion engine according to claim 1,
   wherein: if the cylinder pressure sensor is to be disposed in a plurality of cylinders, the number of cylinders in which the explosion takes place between cylinders having the cylinder pressure sensors is equal.

4. A torque estimating system for an internal combustion engine including a plurality of cylinders, the system comprising:
   a cylinder pressure sensor disposed in a predetermined first cylinder of the internal combustion engine;
   a device for acquiring a cylinder pressure of the first cylinder based on a detection signal of the cylinder pressure sensor;
   a device for calculating a first crank angular acceleration resulting from an explosion in the first cylinder;
   a device for calculating a second crank angular acceleration resulting from an explosion in a second cylinder in which the explosion takes place following the first cylinder;

a device for calculating measured indicated torque resulting from the explosion in the first cylinder based on the cylinder pressure of the first cylinder; and a device for calculating estimated indicated torque resulting from the explosion in the second cylinder using a difference value between the second angular acceleration and the first angular acceleration, and the measured indicated torque of the first cylinder, wherein: the estimated indicated torque calculating device calculates a sum of the difference value multiplied by a moment of inertia and the measured indicated torque as the estimated indicated torque resulting from the explosion in the second cylinder.

* * * * *